United States Patent
Nagata et al.

(10) Patent No.: US 9,337,907 B2
(45) Date of Patent: May 10, 2016

(54) RADIO COMMUNICATION SYSTEM, RADIO BASE STATION APPARATUS, USER TERMINAL AND RADIO COMMUNICATION METHOD

(71) Applicant: NTT DOCOMO, INC., Tokyo (JP)

(72) Inventors: Satoshi Nagata, Tokyo (JP); Yoshihisa Kishiyama, Tokyo (JP); Kazuaki Takeda, Tokyo (JP); Xiaoming She, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 55 days.

(21) Appl. No.: 14/356,289

(22) PCT Filed: Nov. 1, 2012

(86) PCT No.: PCT/JP2012/078341
§ 371 (c)(1),
(2) Date: May 5, 2014

(87) PCT Pub. No.: WO2013/069538
PCT Pub. Date: May 16, 2013

(65) Prior Publication Data
US 2014/0307630 A1    Oct. 16, 2014

(30) Foreign Application Priority Data

Nov. 7, 2011    (JP) ................................ 2011-244007
Nov. 10, 2011   (JP) ................................ 2011-246875

(51) Int. Cl.
*H04W 4/00*        (2009.01)
*H04B 7/02*        (2006.01)
(Continued)

(52) U.S. Cl.
CPC .............. *H04B 7/024* (2013.01); *H04L 5/0051* (2013.01); *H04L 25/0202* (2013.01); *H04L 25/0224* (2013.01); *H04L 25/0226* (2013.01)

(58) Field of Classification Search
CPC .. H04B 7/024; H04B 25/0202; H04B 5/0051; H04B 25/0224; H04B 25/0226
See application file for complete search history.

(56) References Cited

U.S. PATENT DOCUMENTS

| | | | |
|---|---|---|---|
| 8,493,887 B2 | 7/2013 | Palanki et al. | |
| 2007/0218917 A1* | 9/2007 | Frederiksen et al. | 455/450 |
| 2010/0034077 A1* | 2/2010 | Ishii et al. | 370/210 |
| 2010/0232384 A1* | 9/2010 | Farajidana et al. | 370/329 |

(Continued)

FOREIGN PATENT DOCUMENTS

| | | |
|---|---|---|
| JP | 2011-142516 A | 7/2011 |
| WO | 2010/021513 A2 | 2/2010 |
| WO | 2010/078271 A2 | 7/2010 |

OTHER PUBLICATIONS

International Search Report for corresponding International Application No. PCT/JP2012/078341, mailed Dec. 4, 2012 (2 pages).

(Continued)

*Primary Examiner* — Robert Wilson
(74) *Attorney, Agent, or Firm* — Osha Liang LLP

(57) ABSTRACT

To enable a user terminal to determine a cell of a downlink signal also in a heterogeneous environment using the same cell identification information, and thereby enable reception accuracy to be maintained, a radio communication method of the invention is characterized in that a radio base station apparatus generates a reference signal sequence by using a pseudo random sequence including user specific information, and transmits the reference signal sequence to a user terminal, and that the user terminal performs signal processing using the reference signal sequence transmitted from the radio base station apparatus.

7 Claims, 7 Drawing Sheets

(51) Int. Cl.
  *H04L 25/02* (2006.01)
  *H04L 5/00* (2006.01)

(56) References Cited

U.S. PATENT DOCUMENTS

| | | | |
|---|---|---|---|
| 2011/0195720 A1 | 8/2011 | Han et al. | |
| 2012/0033540 A1* | 2/2012 | Kim et al. | 370/203 |
| 2012/0263068 A1 | 10/2012 | Morimoto et al. | |
| 2014/0254539 A1* | 9/2014 | Nagata et al. | 370/329 |
| 2014/0307630 A1* | 10/2014 | Nagata et al. | 370/328 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

Office Action in counterpart Japanese Patent Application No. 2011-246875, dated Sep. 15, 2015 (5 pages).

Catt, "DL Reference Signal Enhancement for CoMP Transmission"; 3GPP TSG RAN WG1 Meeting #66bis, R1-112960; Zhuhai, China; Oct. 10-14, 2011 (3 pages).

NTT DOCOMO, Inc.; "DL RS for CoMP Chairman's Notes"; 3GPP TSG RAN WG1 Meeting #66bis, R1-113594; Zhuhai, China, Oct. 10-14, 2011 (2 pages).

Nokia Siemens Networks, Nokia Corporation,; "Downlink reference signal enchancemants for CoMP"; 3GPP TSG-RAN WG1 Meeting #66bis, R1-113146; Zhuhai, China, Oct. 10-14, 2011 (2 pages).

* cited by examiner

RADIO COMMUNICATION SYSTEM, RADIO BASE STATION APPARATUS, USER TERMINAL AND RADIO COMMUNICATION METHOD

TECHNICAL FIELD

The present invention relates to a radio communication system, radio base station apparatus, user terminal and radio communication method applicable to a cellular system and the like.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband-Code Division Multiple Access). For the UMTS network, for the purpose of further increasing high-speed data rates, providing low delay and the like, Long Term Evolution (LTE) has been studied (Non-patent Document 1).

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)).

In addition, as one of promising techniques to further improve system performance of LTE system, there is inter-cell orthogonalization. For example, in the LTE-A system, intra-cell orthogonalization is achieved by orthogonal multiple access both in uplink and downlink. In other words, in downlink, user terminals UEs (User Equipments) are orthogonalized in the frequency domain. Meanwhile, for inter-cell, interference randomizing by 1-cell frequency reuse is a base as in W-CDMA.

Therefore, the 3GPP (3rd Generation Partnership Project) has studied Coordinated Multi-Point transmission/reception (CoMP) as techniques for actualizing inter-cell orthogonalization. In CoMP transmission/reception, a plurality of cells coordinates to perform signal processing of transmission and reception on a single or a plurality of user terminals UEs. For example, in downlink, studied are plurality-of-cell simultaneous transmission applying precoding, Coordinated Scheduling/Beamforming and the like. By applying these CoMP transmission/reception techniques, it is expected to improve throughput characteristics of user terminals UEs particularly positioned at the cell edge.

As an environment to apply CoMP transmission/reception, for example, there are a configuration (centralized control based on the RRE configuration) including a plurality of remote radio equipments (RREs) connected to a radio base station apparatus (radio base station apparatus eNB) with optical fibers or the like, and another configuration (autonomous decentralized control based on the independent base station configuration) of a radio base station apparatus (radio base station apparatus eNB). In the RRE configuration, as shown in FIG. 1, the radio base station apparatus eNB controls the remote radio equipments RREs in a centralized manner. In the RRE configuration, since the radio base station apparatus eNB (centralized base station) that performs baseband signal processing and control of a plurality of remote radio equipments RREs and each cell (i.e. each remote radio equipment RRE) are connected with baseband signals using optical fibers, the centralized base station is capable of collectively performing radio resource control among cells. Accordingly, in the RRE configuration, in downlink, it is possible to apply the method using high-speed inter-cell signal processing such as plurality-of-cell simultaneous transmission. In FIG. 1, transmission power of the remote radio equipment RRE is almost the same as transmission power of the radio base station apparatus (macro base station) eNB (high transmission power RRE).

As another environment to apply CoMP transmission/reception, as shown in FIG. 2, there is an overlay type network environment (heterogeneous environment) in which a plurality of remote radio equipments RREs is provided in a cover area of a radio base station apparatus (macro base station) eNB. In this environment, there are an environment (first heterogeneous environment) in which a cell of the macro base station eNB and a cell of each remote radio equipment RRE are different from each other i.e. cell identification information (cell ID) of the macro base station eNB and a cell ID of the remote radio equipment RRE are different from each other, and another environment (second heterogeneous environment) in which a cell of the macro base station eNB and a cell of each remote radio equipment RRE are the same i.e. a cell ID of the macro base station eNB and a cell ID of the remote radio equipment RRE are the same. In FIG. 2, transmission power of the remote radio equipment RRE is lower than transmission power of the radio base station apparatus (macro base station) eNB (low transmission power RRE).

PRIOR ART DOCUMENT

Non-Patent Document

[Non-patent Document 1] 3GPP, TR25.912 (V7.1.0), "Feasibility study for Evolved UTRA and UTRAN", September 2006

SUMMARY OF INVENTION

Technical Problem

In the second heterogeneous environment, since the cell ID of the macro base station eNB is the same as the cell ID of the remote radio equipment RRE, the need of handover is eliminated, and the second heterogeneous environment is regarded as being an environment with easier control than the first heterogeneous environment. However, in the second heterogeneous environment, since the cell (hexagonal cell in FIG. 2) of the macro base station eNB and the cells (circular cells) of the remote radio equipments RREs are not distinguished, a user terminal UE is hard to determine a cell of a downlink signal, and there is a problem that reception accuracy thereby degrades. For example, when a user terminal is not capable of determining a cell which transmits a reference signal sequence such as a demodulation reference signal and channel state information reference signal, there is a problem that demodulation accuracy and channel estimation accuracy degrades.

The present invention was made in view of such respects, and it is an object of the invention to provide a radio communication system, radio base station apparatus, user terminal and radio communication method which enable a user terminal to determine a cell of a downlink signal also in a heterogeneous environment using the same cell identification information, and thereby enable reception accuracy to be maintained.

Solution to Problem

A radio communication system of the present invention is a radio communication system provided with a plurality of radio base station apparatuses, and a user terminal configured to be able to perform Coordinated Multi-Point transmission/reception with the plurality of radio base station apparatuses, and is characterized in that the radio base station apparatus has a generation section configured to generate a reference signal sequence by using a pseudo random sequence using user specific information, and a transmission section configured to transmit the reference signal sequence to a user terminal, and that the user terminal has a signal processing section configured to perform signal processing using the reference signal sequence transmitted from the radio base station apparatus.

A radio base station apparatus of the invention is a radio base station apparatus in a radio communication system provided with a plurality of radio base station apparatuses, and a user terminal configured to be able to perform Coordinated Multi-Point transmission/reception with the plurality of radio base station apparatuses, and is characterized by having a generation section configured to generate a reference signal sequence by using a pseudo random sequence using user specific information, and a transmission section configured to transmit the reference signal sequence to a user terminal.

A user terminal of the invention is a user terminal in a radio communication system provided with a plurality of radio base station apparatuses, and a user terminal configured to be able to perform Coordinated Multi-Point transmission/reception with the plurality of radio base station apparatuses, and is characterized by having a signal processing section configured to perform signal processing using a reference signal sequence which is generated by using a pseudo random sequence using user specific information and which is transmitted from the radio base station apparatus.

A radio communication method of the invention is a radio communication method in a radio communication system provided with a plurality of radio base station apparatuses, and a user terminal configured to be able to perform Coordinated Multi-Point transmission/reception with the plurality of radio base station apparatuses, and is characterized having the steps of in the radio base station apparatus, generating a reference signal sequence by using a pseudo random sequence using user specific information, transmitting the reference signal sequence to a user terminal, and in the user terminal, performing signal processing using the reference signal sequence transmitted from the radio base station apparatus.

Advantageous Effects of Invention

According to the present invention, also in the heterogeneous environment using the same cell identification information, a user terminal is capable of determining a cell of a downlink, and it is thereby possible to maintain reception accuracy.

DESCRIPTION OF EMBODIMENTS

Figure 1:
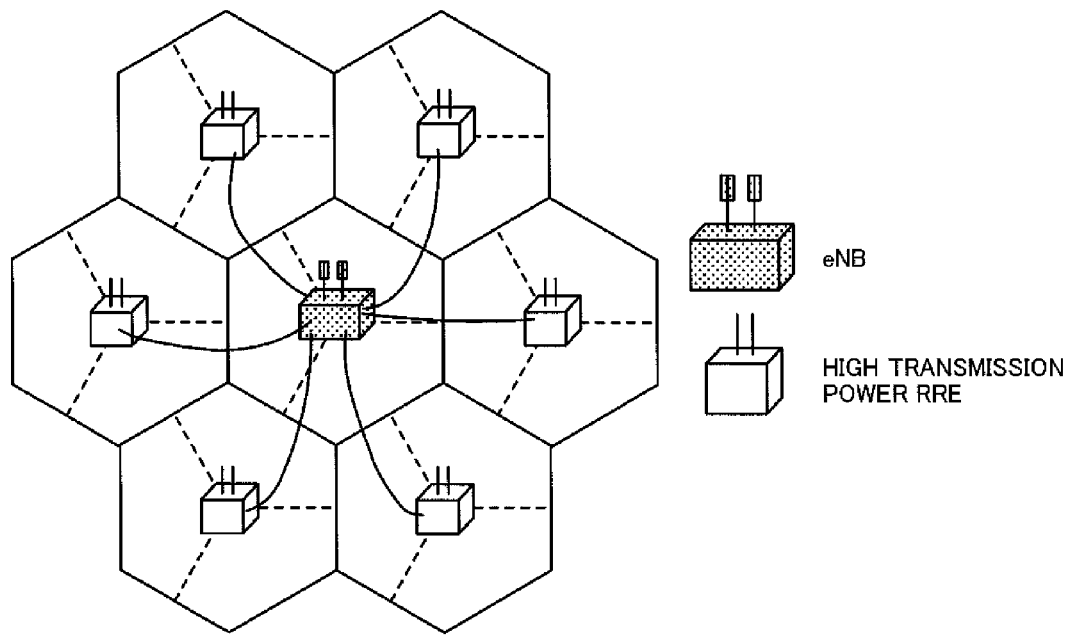
FIG. 1 is a diagram to explain Coordinated Multi-Point transmission.
Figure 2:
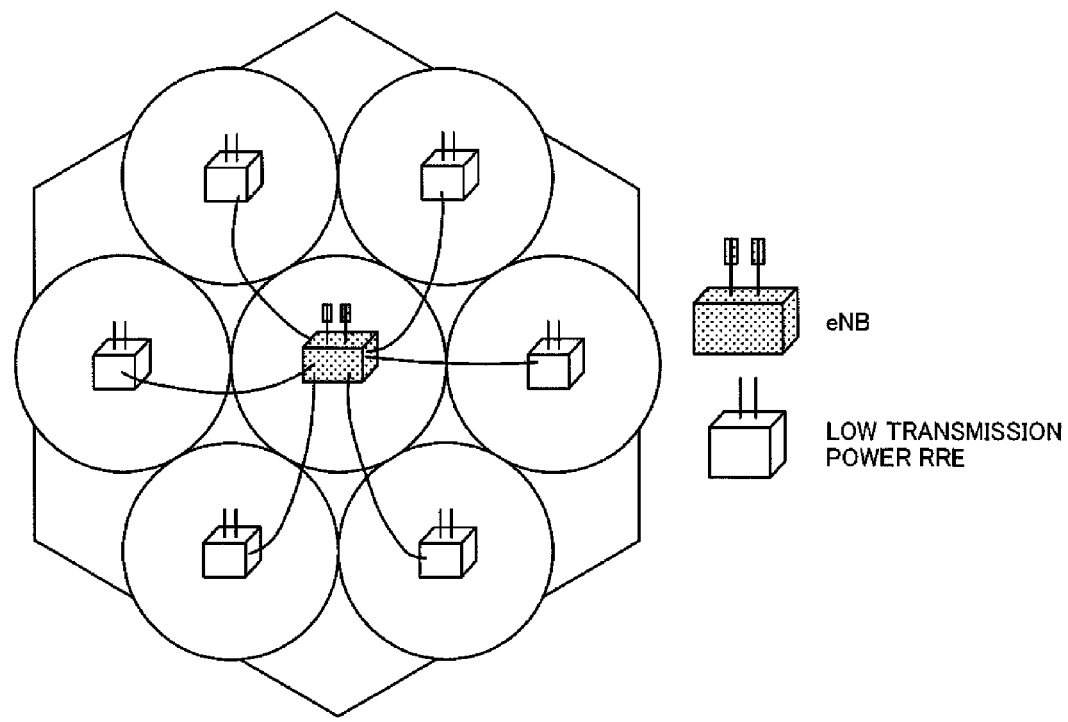
FIG. 2 is another diagram to explain Coordinated Multi-Point transmission.

An Embodiment of the present invention will specifically be described below with reference to accompanying drawings.

Downlink CoMP transmission will be described first. As downlink CoMP transmission, there are Coordinated Scheduling/Coordinated Beamforming and Joint processing. Coordinated Scheduling/Coordinated Beamforming is a method for transmitting a shared data channel to one user terminal UE from only one cell, where radio resources in the frequency/spatial domain are allocated with consideration given to interference from another cell and interference to another cell. Meanwhile, Joint processing is a method for transmitting shared data channels from a plurality of cells at the same time by applying precoding, and has Joint transmission in which a plurality of cells transmits shared data channels to one user terminal UE, and Dynamic Point Selection (DPS) in which one cell is instantaneously selected and transmits a shared data channel.

In the environment (second heterogeneous environment) in which the cell of the macro base station eNB is the same as the cell of the remote radio equipment RRE i.e. the cell ID of the macro base station eNB is the same as the cell ID of the remote radio equipment RRE, it is considered applying CoMP transmission as described above. In this case, in generating a reference signal sequence (for example, demodulation reference signal sequence (DM-RS sequence) and channel state information reference signal sequence (CSI-RS sequence)), since the cell ID of the macro base station eNB is the same as the cell ID of the remote radio equipment RRE, such a possibility is high that the same reference signal sequences (DM-RS sequence, CSI-RS sequence) are applied among the macro base station eNB and a plurality of remote radio equipments RREs, and that the reference signals (DM-RS, CSI-RS) are multiplexed into the same radio resources.

The reference signal sequence will be described herein. DM-RS sequence r(m) is defined by following equation (1) (Release 10 LTE). A pseudo random sequence c(i) included in this equation (1) is initialized as described below ($C_{init}$). As can be seen from this initialized pseudo random sequence $C_{init}$, a term $N_{ID}^{cell}$ varying with the cell ID is included in the initialized pseudo random sequence $C_{init}$. In addition, this pseudo random sequence c(i) is generated by using a 31-length Gold sequence. Further, scrambling identification information (SCID) is included in the initialized pseudo random sequence $C_{init}$. This SCID takes values of "0" and "1" (beginning of each subframe). Thus, the pseudo random sequence used in generating the DM-RS sequence r(m) is set to vary with the cell ID.

$$r(m) = \frac{1}{\sqrt{2}}(1 - 2 \cdot c(2m)) + j\frac{1}{\sqrt{2}}(1 - 2 \cdot c(2m+1)), \quad [\text{Eq. 1}]$$

$$m = \begin{cases} 0, 1, \ldots, 12N_{RB}^{max,DL} - 1 & normal cyclic prefix \\ 0, 1, \ldots, 16N_{RB}^{max,DL} - 1 & extended cyclic prefix \end{cases}$$

Initialized pseudo random sequence $$c_{init} = (\lfloor n_s/2 \rfloor + 1) \cdot (2N_{ID}^{cell} + 1) \cdot 2^{16} + n_{SCID}$$

$n_{SCID}$: 0, 1 (beginning of each subframe)
$N_{RB}^{PDSCH}$: Bandwidth of a resource block of corresponding PDSCH transmission
c(i): pseudo random sequence (31-length Gold sequence)

Further, CSI-RS sequence $r_{l,n_s}(m)$ is defined by following equation (2) (Release 10 LTE). A pseudo random sequence c(i) included in this equation (2) is initialized as described below ($C_{init}$). As can be seen from this initialized pseudo random sequence $C_{init}$, a term $N_{ID}^{cell}$ varying with the cell ID is included in the initialized pseudo random sequence $C_{init}$. Thus, the pseudo random sequence used in generating the CSI-RS sequence $r_{l,n_s}(m)$ is also set to vary with the cell ID.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad [\text{Eq. 2}]$$

$$m = 0, 1, \ldots, N_{RB}^{max,DL} - 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$n_s$: Slot number in a radio frame
l: OFDM symbol number in a slot $$N_{CP} = \begin{cases} 1 & \text{for normal } CP \\ 0 & \text{for extended } CP \end{cases}$$

Figure 3:
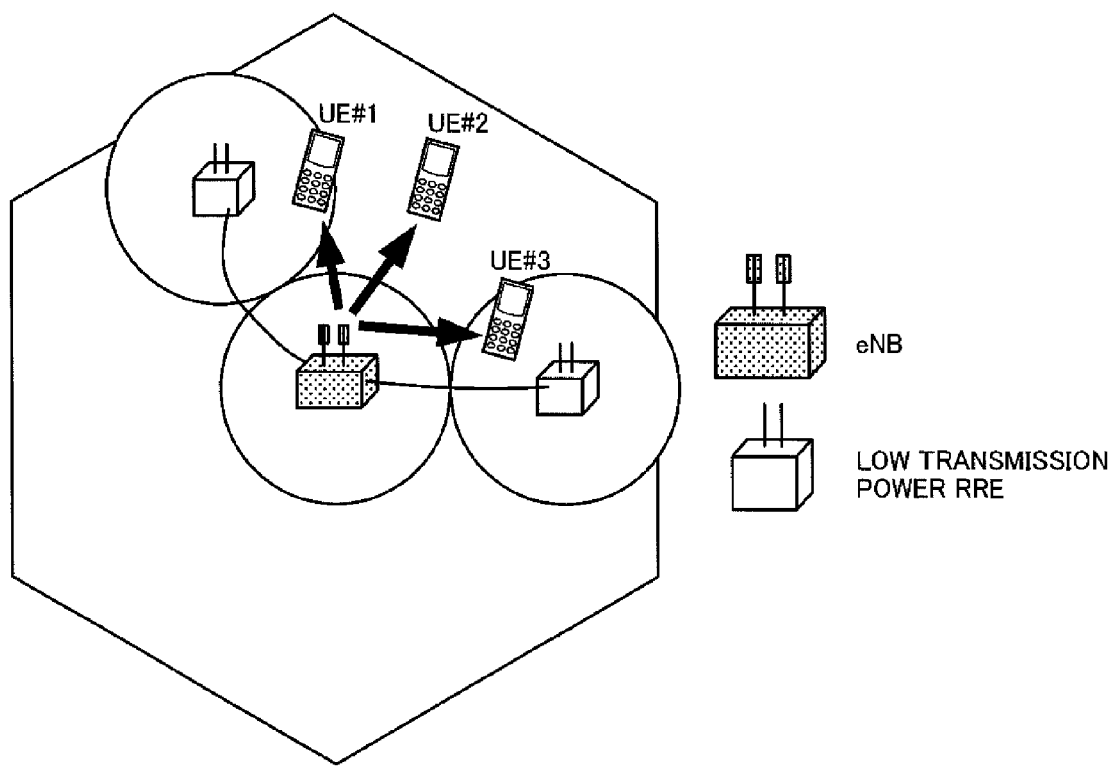
FIG. 3 is a diagram illustrating downlink in Coordinated Multi-Pointe transmission.

As described above, since both the DM-RS sequence and the CSI-RS sequence are generated by using the pseudo random sequence including the term varying with the cell ID, in the second heterogeneous environment, the cell ID of the macro base station eNB is the same as the cell ID of the remote radio equipment RRE, and therefore, such a possibility is high that the same DM-RS sequences and CSI-RS sequences are applied among the macro base station eNB and a plurality of remote radio equipments RREs, and that the DM-RSs and CSI-RSs are multiplexed into the same radio resources. In such a state, it is difficult that a user terminal determines whether a downlink signal is a downlink signal from the macro base station eNB or a downlink signal from the remote radio equipment RRE (collision of reference signals) (FIG. 3). Therefore, there is a possibility that signal processing accuracy degrades in the user terminal. In other words, there is a fear that the collision of DM-RSs results in degradation in channel estimation accuracy of the DM-RS and demodulation accuracy of a PDSCH and that the collision of CSI-RSs results in degradation in channel estimation accuracy of the CSI-RS and CSI estimation accuracy.

The inventor of the present invention noted that the possibility that the collision of reference signals occurs in the second heterogeneous environment is high by the term varying with the cell ID being included in the pseudo random sequence used in generating a reference signal sequence, found out that it is possible to avoid the collision of reference signals in the second heterogeneous environment by using user specific information e.g. user identification information (UEID) in the pseudo random sequence used in generating a reference signal sequence, and arrived at the invention.

In other words, the gist of the invention is that a radio base station apparatus generates a reference signal sequence by using a pseudo random sequence using user specific information, and transmits the reference signal to a user terminal, the user terminal performs signal processing using the reference signal sequence transmitted from the radio base station apparatus, and thereby determines the cell of the downlink signal also in the heterogeneous environment using the same cell identification information, and that reception accuracy is thus maintained.

In the invention, the user specific information e.g. user identification information (UEID) is used for a pseudo random sequence used in generating a reference signal sequence.

As shown in following equation (3), a DM-RS sequence is generated by using user identification information (UEID) as a substitute for the cell ID in the pseudo random sequence (first method). In other words, the term $N_{ID}^{cell}$ in equation (1) in the initialized pseudo random sequence is changed to a term $UE_{ID}$.

$$c_{init} = (\lfloor n_s/2 \rfloor + 1) \cdot (2UE_{ID} + 1) \cdot 2^{16} + n_{SCID} \quad [\text{Eq. 3}]$$

When a DM-RS sequence is generated by using the pseudo random sequence expressed in above-mentioned equation (1), in the second heterogeneous environment as shown in FIG. 3, since the cell ID of the cell of the macro base station eNB is the same as the cell ID of the cell of the overlaid remote radio equipment RRE, the same DM-RS sequences are used among user terminals UEs #1 to #3, a possibility is high that multiplexing positions of DM-RSs are the same, a collision of DM-RSs thereby occurs, and it is difficult that the user terminal UE determines whether a downlink signal is a downlink signal from the macro base station eNB or a downlink signal from the remote radio equipment RRE. By this event, there is a fear of resulting in degradation in channel estimation accuracy of the DM-RS and demodulation accuracy of a PDSCH. Meanwhile, when the DM-RS sequence is generated by using the pseudo random sequence expressed in above-mentioned equation (3), in the second heterogeneous environment as shown in FIG. 3, although the cell ID of the cell of the macro base station eNB is the same as the cell ID of the cell of the overlaid remote radio equipment RRE, since UEIDs are mutually different among the user terminals UEs #1 to #3, different DM-RS sequences are used among the user terminals UEs #1 to #3, and the possibility is low that the multiplexing positions of DM-RSs are the same. Therefore, the collision of DM-RSs does not occur, and it is made ease that the user terminal UE determines whether a downlink signal is a downlink signal from the macro base station eNB or a downlink signal from the remote radio equipment RRE. As a result, it is possible to maintain channel estimation accuracy of the DM-RS and demodulation accuracy of the PDSCH. In the first method of the invention, the pseudo random sequence using above-mentioned equation (3) is the pseudo random sequence using the user specific information.

Further, as shown in following equation (4), a DM-RS sequence is generated by using user specific information X1 as a substitute for the cell ID in the pseudo random sequence (second method (1)). In other words, the term $N_{ID}^{cell}$ in equation (1) in the initialized pseudo random sequence is changed to a term X1.

$$c_{init} = (\lfloor n_s/2 \rfloor + 1) \cdot (2(X1 + 2^9) + 1) \cdot 2^{16} + n_{SCID} \quad [\text{Eq. 4}]$$

Furthermore, as shown in following equation (5), a DM-RS sequence is generated by adding the user specific information X1 to the cell ID in the pseudo random sequence (second method (2)). In other words, the term X1 is added to the term $N_{ID}^{cell}$ in equation (1) in the initialized pseudo random sequence.

$$c_{init}=(\lfloor n_s/2 \rfloor+1)\cdot(2(N_{ID}^{cell}+2^9\cdot X1)+1)\cdot 2^{16}+n_{SCID} \qquad [\text{Eq. 5}]$$

Herein, the term X1 in the initialized pseudo random sequence is a term using the user specific information. At this point, the user terminal is notified of X1 by higher layer or signaling (for example, RRC signaling). X1 is a user specific value, and the same X1 is signaled to user terminals of a particular group. By this means, without being restricted by the UEID, it is possible to make the pseudo random sequence using the user specific information.

When a DM-RS sequence is generated by using the pseudo random sequence expressed in above-mentioned equation (1), in the second heterogeneous environment as shown in FIG. 3, since the cell ID of the cell of the macro base station eNB is the same as the cell ID of the cell of the overlaid remote radio equipment RRE, the same DM-RS sequences are used among user terminals UEs #1 to #3, a possibility is high that multiplexing positions of DM-RSs are the same, a collision of DM-RSs thereby occurs, and it is difficult that the user terminal UE determines whether a downlink signal is a downlink signal from the macro base station eNB or a downlink signal from the remote radio equipment RRE. By this event, there is a fear of resulting in degradation in channel estimation accuracy of the DM-RS and demodulation accuracy of a PDSCH. Meanwhile, when the DM-RS sequence is generated by using the pseudo random sequence expressed in above-mentioned equation (4) or (5), in the second heterogeneous environment as shown in FIG. 3, although the cell ID of the cell of the macro base station eNB is the same as the cell ID of the cell of the overlaid remote radio equipment RRE, different pseudo random sequences are generated using higher layer signaling notified from the radio base station apparatus, different DM-RS sequences are thereby used among the user terminals UEs #1 to #3, and the possibility is low that the multiplexing positions of DM-RSs are the same. Therefore, the collision of DM-RSs does not occur, and it is made ease that the user terminal UE determines whether a downlink signal is a downlink signal from the macro base station eNB or a downlink signal from the remote radio equipment RRE. As a result, it is possible to maintain channel estimation accuracy of the DM-RS and demodulation accuracy of the PDSCH.

Further, as shown in following equation (6), a DM-RS sequence is generated by using a UEID as a substitute for the SCID in the pseudo random sequence (third method). In other words, the term $n_{SCID}$ in equation (1) in the initialized pseudo random sequence is changed to a term X2 (X2 is a term using the user specific information ($UE_{ID}$)).

$$c_{init}=(\lfloor n_s/2 \rfloor+1)\cdot(2N_{ID}^{cell}+1)\cdot 2^{16}+X2 \qquad [\text{Eq. 6}]$$

Herein, the term X2 in the initialized pseudo random sequence is a term using the user specific information ($UE_{ID}$). The term $n_{SCID}$ is dynamically transmitted from the radio base station apparatus to the user terminal with a downlink control channel signal. In the case of using the pseudo random sequence of above-mentioned equation (1), the value of the term $n_{SCID}$ is "0" or "1", and is transmitted by 1 bit in downlink control information (DCI). In the present invention, the term X2 is dynamically transmitted with the downlink control signal (DCI). At this point, it is possible to define the value "0" or "1" of X2 as described below. By defining as described below, the form of notification using the DCI is not changed. Further, by such a definition, it is possible to achieve backward compatibility. In the third method of the invention, the pseudo random sequence using the term X2 defined as described below is the pseudo random sequence using the user specific information.

X2=0: Value "0" not to use the UEID
X2=1: UEID (UE number)

When a DM-RS sequence is generated by using the pseudo random sequence expressed in above-mentioned equation (1), in the second heterogeneous environment as shown in FIG. 3, since the cell ID of the cell of the macro base station eNB is the same as the cell ID of the cell of the overlaid remote radio equipment RRE, the same DM-RS sequences are used among user terminals UEs #1 to #3, a possibility is high that multiplexing positions of DM-RSs are the same, a collision of DM-RSs thereby occurs, and it is difficult that the user terminal UE determines whether a downlink signal is a downlink signal from the macro base station eNB or a downlink signal from the remote radio equipment RRE. By this event, there is a fear of resulting in degradation in channel estimation accuracy of the DM-RS and demodulation accuracy of a PDSCH. Meanwhile, when the DM-RS sequence is generated by using the pseudo random sequence expressed in above-mentioned equation (6), in the second heterogeneous environment as shown in FIG. 3, although the cell ID of the cell of the macro base station eNB is the same as the cell ID of the cell of the overlaid remote radio equipment RRE, since UEIDs are mutually different among the user terminals UEs #1 to #3, different DM-RS sequences are used among the user terminals UEs #1 to #3, and the possibility is low that the multiplexing positions of DM-RSs are the same. Therefore, the collision of DM-RSs does not occur, and it is made ease that the user terminal UE determines whether a downlink signal is a downlink signal from the macro base station eNB or a downlink signal from the remote radio equipment RRE. As a result, it is possible to maintain channel estimation accuracy of the DM-RS and demodulation accuracy of the PDSCH.

Further, as shown in following equation (7), a DM-RS sequence is generated by adding a term Y1 (fourth method). In other words, the term Y1 is added to equation (1) in the initialized pseudo random sequence.

$$c_{init}=(\lfloor n_s/2 \rfloor+1)\cdot(2N_{ID}^{cell}+1)\cdot 2^{16}+n_{SCID}+Y1 \qquad [\text{Eq. 7}]$$

Herein, the term Y1 in the initialized pseudo random sequence is specific to a user. The information of the term Y1 is notified to the user terminal from the radio base station apparatus by higher layer signaling (for example, RRC signaling). In the fourth method of the invention, the pseudo random sequence using above-mentioned equation (7) is the pseudo random sequence (pseudo random sequence to achieve UE-specific operation) using the user specific information in the radio base station apparatus.

When a DM-RS sequence is generated by using the pseudo random sequence expressed in above-mentioned equation (1), in the second heterogeneous environment as shown in FIG. 3, since the cell ID of the cell of the macro base station eNB is the same as the cell ID of the cell of the overlaid remote radio equipment RRE, the same DM-RS sequences are used among user terminals UEs #1 to #3, a possibility is high that multiplexing positions of DM-RSs are the same, a collision of DM-RSs thereby occurs, and it is difficult that the user terminal UE determines whether a downlink signal is a downlink signal from the macro base station eNB or a downlink signal from the remote radio equipment RRE. By this event, there is a fear of resulting in degradation in channel estimation accuracy of the DM-RS and demodulation accuracy of a PDSCH. Meanwhile, when the DM-RS sequence is generated by using the pseudo random sequence expressed in above-mentioned equation (7), in the second heterogeneous environment as shown in FIG. 3, although the cell ID of the cell of the macro base station eNB is the same as the cell ID of the cell of the overlaid remote radio equipment RRE, different pseudo random sequences are generated using higher layer signaling notified from the radio base station apparatus, different DM-RS sequences are thereby used among the user terminals UEs #1 to #3, and the possibility is low that the multiplexing positions of DM-RSs are the same. Therefore, the collision of DM-RSs does not occur, and it is made ease that the user terminal UE determines whether a downlink signal is a downlink signal from the macro base station eNB or a downlink signal from the remote radio equipment RRE. As a result, it is possible to maintain channel estimation accuracy of the DM-RS and demodulation accuracy of the PDSCH.

As shown in following equation (8), a CSI-RS sequence is generated by adding a UEID in the pseudo random sequence (fifth method). In other words, the $UE_{ID}$ is added to equation (2) in the initialized pseudo random sequence.

$$c_{init}=2^{10} \cdot (7 \cdot (n_s+1)+l+1) \cdot (2 \cdot N_{ID}^{cell}+1)+2 \cdot N_{ID}^{cell}+N_{CP}+UE_{ID} \qquad [\text{Eq. 8}]$$

When a CSI-RS sequence is generated by using the pseudo random sequence expressed in above-mentioned equation (2), in the second heterogeneous environment as shown in FIG. 3, since the cell ID of the cell of the macro base station eNB is the same as the cell ID of the cell of the overlaid remote radio equipment RRE, the same CSI-RS sequences are used among user terminals UEs #1 to #3, a possibility is high that multiplexing positions of CSI-RSs are the same, a collision of CSI-RSs thereby occurs, and it is difficult that the user terminal UE determines whether a downlink signal is a downlink signal from the macro base station eNB or a downlink signal from the remote radio equipment RRE. By this event, there is a fear of resulting in degradation in channel estimation accuracy of the CSI-RS and CSI-RS accuracy. Meanwhile, when the CSI-RS sequence is generated by using the pseudo random sequence expressed in above-mentioned equation (8), in the second heterogeneous environment as shown in FIG. 3, although the cell ID of the cell of the macro base station eNB is the same as the cell ID of the cell of the overlaid remote radio equipment RRE, since UEIDs are mutually different among the user terminals UEs #1 to #3, different CSI-RS sequences are used among the user terminals UEs #1 to #3, and the possibility is low that the multiplexing positions of CSI-RSs are the same. Therefore, the collision of CSI-RSs does not occur, and it is made ease that the user terminal UE determines whether a downlink signal is a downlink signal from the macro base station eNB or a downlink signal from the remote radio equipment RRE. As a result, it is possible to maintain channel estimation accuracy of the CSI-RS and CSI-RS accuracy. In the fifth method of the invention, the pseudo random sequence using above-mentioned equation (8) is the pseudo random sequence using the user specific information ($UE_{ID}$).

Further, as shown in following equation (9), a CSI-RS sequence is generated by adding a term X3 in the pseudo random sequence (sixth method). In other words, the term X3 is added to equation (2) in the initialized pseudo random sequence.

$$c_{init}=2^{10} \cdot (7 \cdot (n_s+1)+l+1) \cdot (2 \cdot N_{ID}^{cell}+1)+2 \cdot N_{ID}^{cell}+N_{CP}+X3 \qquad [\text{Eq. 9}]$$

Herein, the term X3 in the initialized pseudo random sequence is a term using the user specific information ($UE_{ID}$).

The term X3 is a term to distinguish between the case of making the initialized pseudo random sequence user specific and the case of not making the initialized pseudo random sequence user specific. For example, in the case of making the sequence user specific, the term X3 is set at the $UE_{ID}$ (in this case, the fifth method). Meanwhile, in the case of not making the sequence user specific, the term X3 is set at "0". In other words, the radio base station apparatus determines whether to be user specific, and based on the determination, changes the initialized pseudo random sequence (determines whether to add the user specific term (X3)). The information of the term X3 (whether to be user specific (whether to add the user specific term)) is notified to the user terminal from the radio base station apparatus by higher layer signaling. In the sixth method of the invention, the pseudo random sequence using above-mentioned equation (9) is the pseudo random sequence using the user specific information.

When a CSI-RS sequence is generated by using the pseudo random sequence expressed in above-mentioned equation (2), in the second heterogeneous environment as shown in FIG. 3, since the cell ID of the cell of the macro base station eNB is the same as the cell ID of the cell of the overlaid remote radio equipment RRE, the same CSI-RS sequences are used among user terminals UEs #1 to #3, a possibility is high that multiplexing positions of CSI-RSs are the same, a collision of CSI-RSs thereby occurs, and it is difficult that the user terminal UE determines whether a downlink signal is a downlink signal from the macro base station eNB or a downlink signal from the remote radio equipment RRE. By this event, there is a fear of resulting in degradation in channel estimation accuracy of the CSI-RS and CSI-RS accuracy. Meanwhile, when the CSI-RS sequence is generated by using the pseudo random sequence expressed in above-mentioned equation (9), in the second heterogeneous environment as shown in FIG. 3, although the cell ID of the cell of the macro base station eNB is the same as the cell ID of the cell of the overlaid remote radio equipment RRE, since UEIDs are mutually different among the user terminals UEs #1 to #3, different CSI-RS sequences are used among the user terminals UEs #1 to #3, and the possibility is low that the multiplexing positions of CSI-RSs are the same. Therefore, the collision of CSI-RSs does not occur, and it is made ease that the user terminal UE determines whether a downlink signal is a downlink signal from the macro base station eNB or a downlink signal from the remote radio equipment RRE. As a result, it is possible to maintain channel estimation accuracy of the CSI-RS and CSI-RS accuracy.

Further, as shown in following equation (10), a CSI-RS sequence is generated by adding a term Y2 in the pseudo random sequence (seventh method). In other words, the term Y2 is added to equation (2) in the initialized pseudo random sequence.

$$c_{init}=2^{10} \cdot (7 \cdot (n_s+1)+l+1) \cdot (2 \cdot N_{ID}^{cell}+1)+2 \cdot N_{ID}^{cell}+N_{CP}+Y2 \qquad [\text{Eq. 10}]$$

Herein, the term Y2 in the initialized pseudo random sequence is specific to a user. The information of the term Y2 is notified to the user terminal from the radio base station apparatus by higher layer signaling (for example, RRC signaling). In the seventh method of the invention, the pseudo random sequence using above-mentioned equation (10) is the pseudo random sequence (pseudo random sequence to achieve UE-specific operation) using the user specific information in the radio base station apparatus.

When a CSI-RS sequence is generated by using the pseudo random sequence expressed in above-mentioned equation (2), in the second heterogeneous environment as shown in FIG. 3, since the cell ID of the cell of the macro base station eNB is the same as the cell ID of the cell of the overlaid remote radio equipment RRE, the same CSI-RS sequences are used among user terminals UEs #1 to #3, a possibility is high that multiplexing positions of CSI-RSs are the same, a collision of CSI-RSs thereby occurs, and it is difficult that the user terminal UE determines whether a downlink signal is a downlink signal from the macro base station eNB or a downlink signal from the remote radio equipment RRE. By this event, there is a fear of resulting in degradation in channel estimation accuracy of the CSI-RS and CSI-RS accuracy. Meanwhile, when the CSI-RS sequence is generated by using the pseudo random sequence expressed in above-mentioned equation (10), in the second heterogeneous environment as shown in FIG. 3, although the cell ID of the cell of the macro base station eNB is the same as the cell ID of the cell of the overlaid remote radio equipment RRE, different pseudo random sequences are generated using higher layer signaling notified from the radio base station apparatus, different CSI-RS sequences are thereby used among the user terminals UEs #1 to #3, and the possibility is low that the multiplexing positions of CSI-RSs are the same. Therefore, the collision of CSI-RSs does not occur, and it is made ease that the user terminal UE determines whether a downlink signal is a downlink signal from the macro base station eNB or a downlink signal from the remote radio equipment RRE. As a result, it is possible to maintain channel estimation accuracy of the CSI-RS and CSI-RS accuracy.

Figure 4:
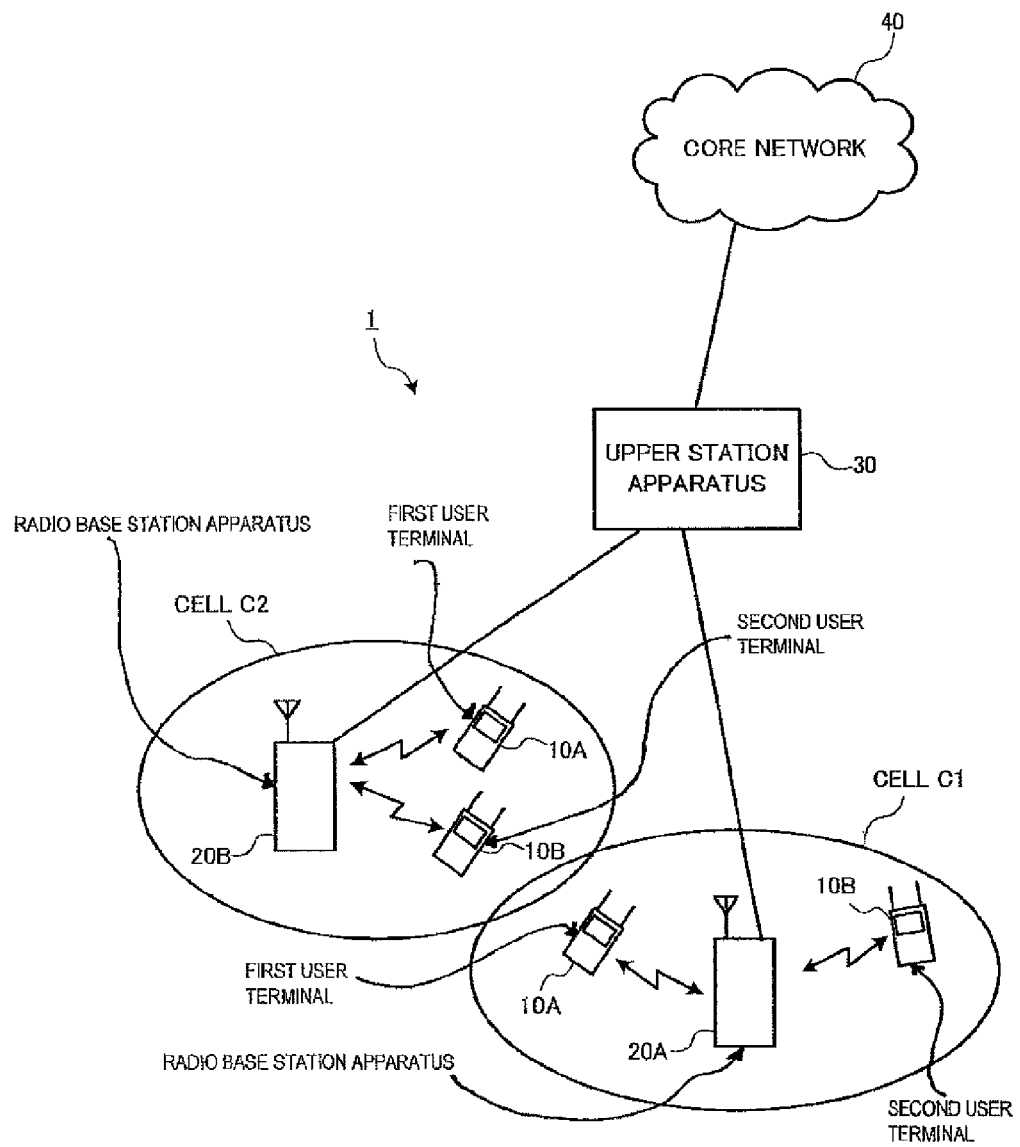
FIG. 4 is a diagram to explain a system configuration of a radio communication system.

A radio communication system according to the Embodiment of the invention will specifically be described below. FIG. 4 is an explanatory diagram of a system configuration of the radio communication system according to this Embodiment. The radio communication system is provided with a plurality of radio base station apparatuses and user terminals configured to be able to perform Coordinated Multi-Pointe transmission/reception with a plurality of radio bade station apparatuses. In addition, the radio communication system as shown in FIG. 4 is a system including the LTE system or SUPER 3G, for example. In the radio communication system, used is carrier aggregation for integrating a plurality of base frequency blocks with a system band of the LTE system as a unit. Further, the radio communication system may be called IMT-Advanced or may be called 4G.

As shown in FIG. 4, the radio communication system 1 includes radio base station apparatuses 20A and 20B, and a plurality of first and second user terminals 10A and 10B that communicate with the radio base station apparatuses 20A and 20B, and is comprised thereof. The radio base station apparatuses 20A and 20B are connected to an upper station apparatus 30, and the upper station apparatus 30 is connected to a core network 40. Further, the radio base station apparatuses 20A and 20B are mutually connected by wired connection or wireless connection. The first and second user terminals 10A and 10B are capable of communicating with the radio base station apparatuses 20A and 20B in cells C1 and C2. In addition, for example, the upper station apparatus 30 includes an access gateway apparatus, radio network controller (RNC), mobility management entity (MME), etc., but is not limited thereto. In addition, among cells, when necessary, a plurality of base stations performs control of CoMP transmission.

The first and second user terminals 10A and 10B include LTE terminals and LTE-A terminals, and are described as first and second user terminals unless otherwise specified in the following description. Further, for convenience in description, the description is given while assuming that equipments that perform radio communications with the radio base station apparatuses 20A and 20B are the first and second user terminals 10A and 10B, and more generally, the equipments may be user equipments (UEs) including user terminals and fixed terminals.

In the radio communication system 1, as a radio access scheme, OFDMA (Orthogonal Frequency Division Multiple Access) is applied in downlink, while SC-FDMA (Single Carrier-Frequency Division Multiple Access) is applied in uplink, and the uplink radio access scheme is not limited thereto. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

The downlink communication channels have the PDSCH (Physical Downlink Shared Channel) as a downlink data channel shared among the first and second user terminals 10A and 10B, and downlink L1/L2 control channels (PDCCH, PCFICH, PHICH). Transmission data and higher control information is transmitted on the PDSCH. Scheduling information of the PDSCH and PUSCH and the like is transmitted on the PDCCH (Physical Downlink Control Channel). The number of OFDM symbols used in the PDCCH is transmitted on the PCFICH (Physical Control Format Indicator Channel). ACK/NACK of HARQ to the PUSCH is transmitted on the PHICH (Physical Hybrid-ARQ Indicator Channel).

The uplink communication channels have the PUSCH (Physical Uplink Shared Channel) as an uplink data channel shared among the user terminals, and the PUCCH (Physical Uplink Control Channel) that is a control channel in uplink. Transmission data and higher control information is transmitted on the PUSCH. Further, on the PUCCH is transmitted downlink reception quality information (CQI), ACK/NACK and the like.

Figure 5:
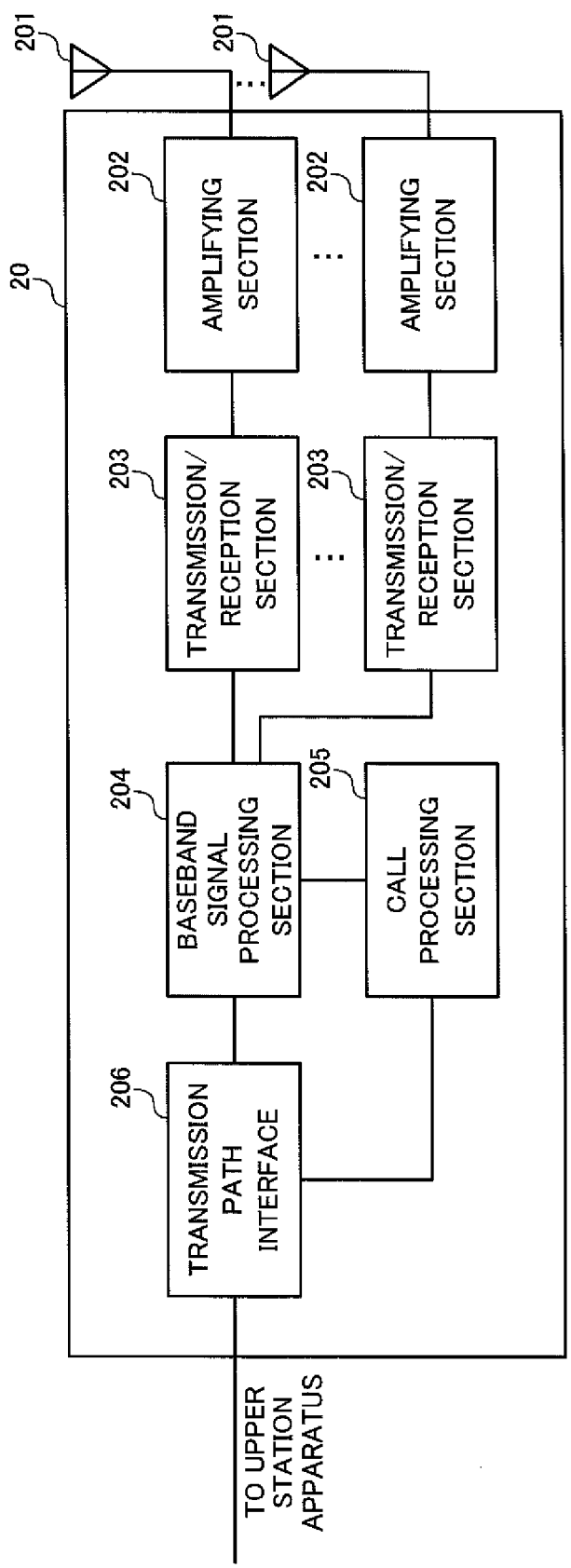
FIG. 5 is a diagram to explain an entire configuration of a radio base station apparatus.

Referring to FIG. 5, described is the entire configuration of the radio base station apparatus according to this Embodiment. In addition, the radio base station apparatuses 20A and 20B have the same configuration, and therefore, are described as the radio base station apparatus 20. Further, the first and second user terminals 10A and 10B described later also have the same configuration, and therefore, are described as the user terminal 10. The radio base station apparatus 20 is provided with transmission/reception antennas 201, amplifying sections 202, transmission/reception sections (notification section) 203, baseband signal processing section 204, call processing section 205 and transmission path interface 206. The transmission data to transmit from the radio base station apparatus 20 to the user terminal in downlink is input to the baseband signal processing section 204 via the transmission path interface 206 from the upper station apparatus 30.

The baseband signal processing section 204 performs, on the downlink data channel signal, PDCP layer processing, segmentation and concatenation of the transmission data, RLC (Radio Link Control) layer transmission processing such as transmission processing of RLC retransmission control, MAC (Medium Access Control) retransmission control e.g. HARQ transmission processing, scheduling, transmission format selection, channel coding, Inverse Fast Fourier Transform (IFFT) processing and precoding processing. Further, on a signal of the Physical Downlink Control Channel that is a downlink control channel, the section 204 also performs transmission processing of channel coding, Inverse Fast Fourier Transform and the like.

Further, the baseband signal processing section 204 notifies user terminals 10 connected to the same cell of control information for each user terminal 10 to perform radio communications with the radio base station apparatus 20 on the broadcast channel. For example, the information for communications in the cell includes the system bandwidth in uplink or downlink, identification information (Root Sequence Index) of a root sequence to generate a signal of a random access preamble on the PRACH (Physical Random Access Channel), etc.

The transmission/reception section 203 converts the frequency of the baseband signal output from the baseband signal processing section 204 into a radio frequency band. The amplifying section 202 amplifies a radio frequency signal subjected to frequency conversion to output to the transmission/reception antenna 201. In addition, the transmission/reception section 203 constitutes reception means for receiving an uplink signal including information of a phase difference among a plurality of cells and PMI, and transmission means for transmitting reference signal sequences to user terminals.

Meanwhile, with respect to signals transmitted from the user terminal 10 to the radio base station apparatus 20 in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204.

The baseband signal processing section 204 performs FFT (Fast Fourier Transform) processing, IDFT (Inverse Discrete Fourier Transform) processing, error correcting decoding, reception processing of MAC retransmission control, and reception processing of RLC layer and PDCP layer on transmission data included in the baseband signal received in uplink. The decoded signal is transferred to the upper station apparatus 30 via the transmission path interface 206.

The call processing section 205 performs call processing such as setting and release of the communication channel, status management of the radio base station apparatus 20, and management of radio resources.

Figure 6:
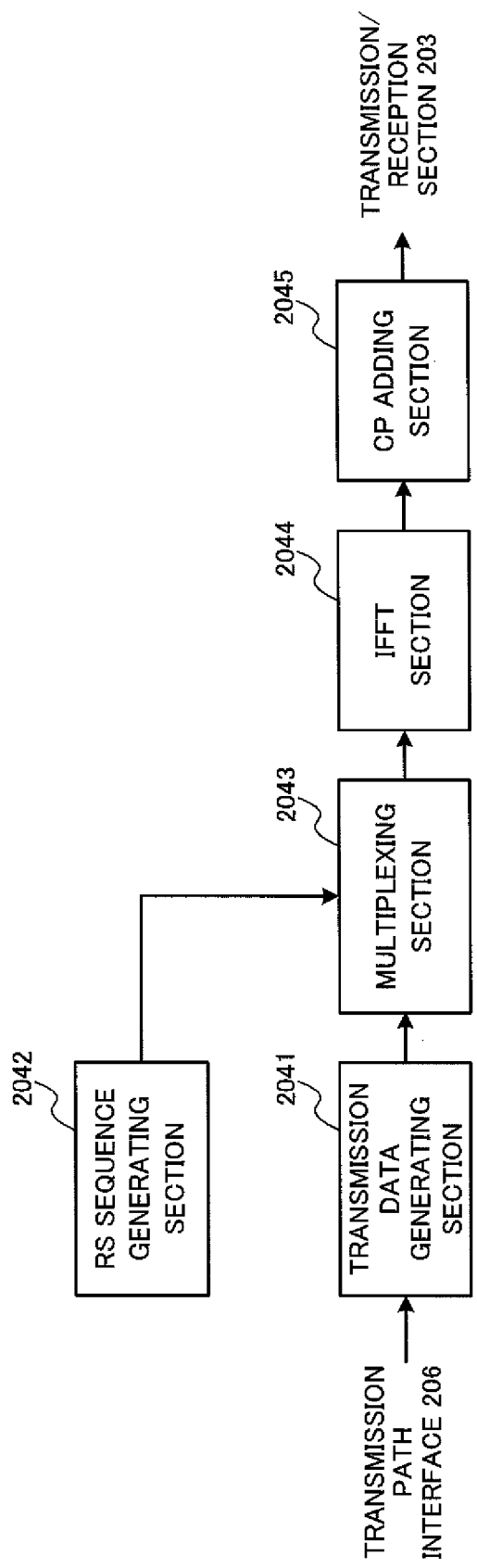
FIG. 6 is a functional block diagram corresponding to a baseband processing section of the radio base station apparatus.

FIG. 6 is a block diagram illustrating a configuration of the baseband signal processing section in the radio base station apparatus as shown in FIG. 5. The baseband signal processing section 204 is mainly comprised of a transmission data generating section 2041, RS sequence generating section 2042, multiplexing section 2043, IFFT (Inverse Fast Fourier Transform) section 2044, and CP (Cyclic Prefix) adding section 2045.

The transmission data generating section 2041 performs error correcting coding and interleaving on a symbol sequence of transmission data. After performing error correcting coding and interleaving on the transmission data, the transmission data generating section 2041 performs serial-parallel transform on a transmission data sequence (n bits constituting one OFDM symbol), and generates a data signal of a plurality of sequences for subcarrier modulation. Interleaving may be performed after generating a data signal of a plurality of sequences. The transmission data generating section 2041 further performs subcarrier modulation on the data signal of a plurality of sequences in parallel.

The RS sequence generating section 2042 generates a reference signal sequence using a pseudo random sequence using a UEID. When the reference signal sequence is a DM-RS sequence, the RS sequence generating section 2042 generates the DM-RS with the DM-RS sequence using the pseudo random sequence expressed in above-mentioned equation (3) (first method), generates the DM-RS with the DM-RS sequence using the pseudo random sequence expressed in above-mentioned equation (4) or (5) (second method), generates the DM-RS with the DM-RS sequence using the pseudo random sequence expressed in above-mentioned equation (6) (third method), or generates the DM-RS with the DM-RS sequence using the pseudo random sequence expressed in above-mentioned equation (7) (fourth method). When the reference signal sequence is a CSI-RS sequence, the RS sequence generating section 2042 generates the CSI-RS with the CSI-RS sequence using the pseudo random sequence expressed in above-mentioned equation (8) (fifth method), generates the CSI-RS with the CSI-RS sequence using the pseudo random sequence expressed in above-mentioned equation (9) (sixth method), or generates the CSI-RS with the CSI-RS sequence using the pseudo random sequence expressed in above-mentioned equation (10) (seventh method). In addition, in the case of the third method, the user terminal is notified of the information of the term $X_2$ in the pseudo random sequence of (Eq. 6) dynamically on a downlink control channel (for example, DCI). In the case of the second method, fourth method, sixth method and seventh method, the user terminal is notified of the information of the term $X_1$ in the pseudo random sequence of (Eq. 4) or (Eq.5), the information of the term $Y_1$ in the pseudo random sequence of (Eq.7), the information of the term $X_3$ in the pseudo random sequence of (Eq.9), and the information of the term $Y_2$ in the pseudo random sequence of (Eq. 10) semi-statically by higher layer signaling (for example, RRC signaling), respectively.

The multiplexing section 2043 multiplexes the transmission data and RSs into radio resources. The IFFT section 2044 performs inverse fast Fourier transform on a transmission signal (subcarrier signal) in the frequency domain to which the transmission data and RSs is subcarrier-mapped. The signal of frequency component assigned to subcarriers is transformed into a signal string of time component by inverse fast Fourier transform. Then, the CP adding section 2045 adds a cyclic prefix.

The entire configuration of the user terminal according to this Embodiment will be described next with reference to FIG. 7. The LTE terminal and the LTE-A terminal have the same configuration of principal part of hardware, and are not distinguished to describe. The user terminal 10 is provided with transmission/reception antennas 101, amplifying sections 102, transmission/reception sections (reception section) 103, baseband signal processing section 104 and application section 105.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to FFT processing, error correcting decoding, reception processing of retransmission control, etc. in the baseband signal processing section 104. Among the data in downlink, the transmission data in downlink is transferred to the application section 105. The application section 105 performs processing concerning layers higher than the physical layer and MAC layer and the like. Further, among the data in downlink, the broadcast information is also transferred to the application section 105.

Meanwhile, with respect to transmission data in uplink, the application section 105 inputs the data to the baseband signal processing section 104. The baseband signal processing section 104 performs mapping processing, transmission processing of retransmission control (HARQ), channel coding, DFT (Discrete Fourier Transform) processing and IFFT processing. The transmission/reception section 103 converts the frequency of the baseband signal output from the baseband signal processing section 104 into a radio frequency band. Then, the amplifying section 102 amplifies the radio frequency signal subjected to frequency conversion to transmit from the transmission/reception antenna 101. In addition, the transmission/reception section 103 constitutes reception means for receiving a downlink signal.

Figure 7:
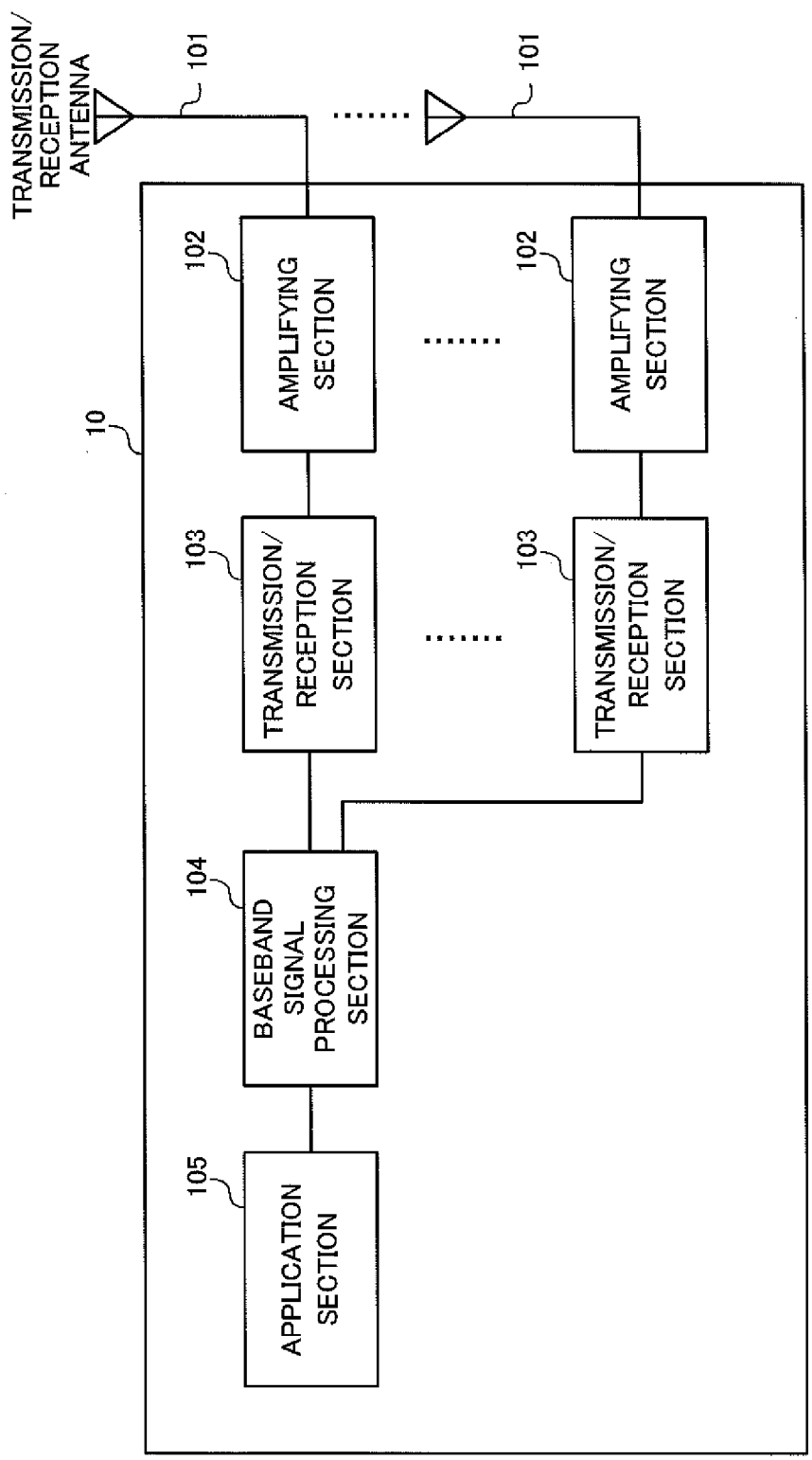
FIG. 7 is a diagram to explain an entire configuration of a user terminal.
Figure 8:
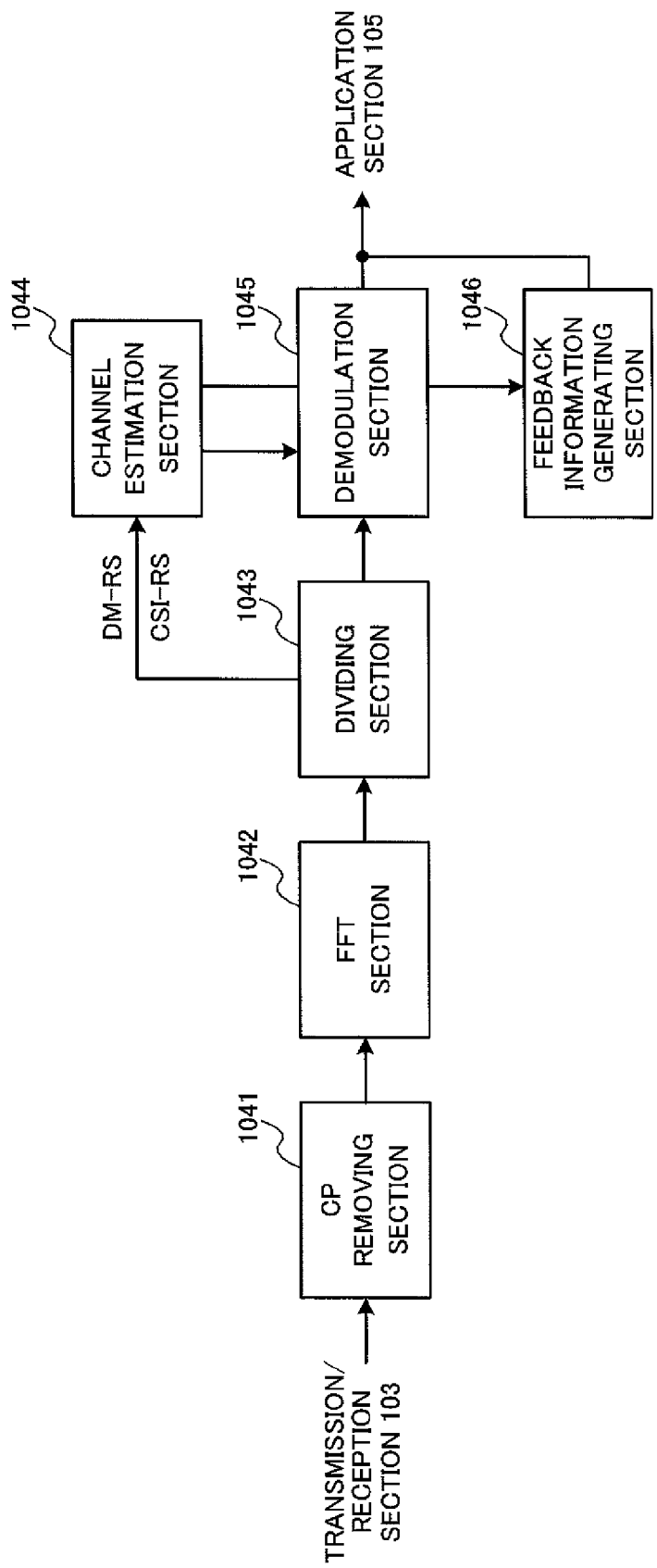
FIG. 8 is a functional block diagram corresponding to a baseband processing section of the user terminal.

FIG. 8 is a block diagram illustrating a configuration of the baseband signal processing section in the user terminal as shown in FIG. 7. The baseband signal processing section 104 is mainly comprised of a CP removing section 1041, FFT section 1042, dividing section 1043, channel estimation section 1044, demodulation section 1045, and feedback information generating section 1046.

The CP removing section 1041 removes a cyclic prefix from a reception signal. The FFT section 1042 performs fast Fourier transform on the CP-removed reception signal, and transforms the time-series signal component into a string of frequency component. The dividing section 1043 performs subcarrier-demapping on the reception signal to divide into the RS and shared channel signal (data signal). The reference signals (DM-RS, CSI-RS) are output to the channel estimation section 1044.

The channel estimation section 1044 performs channel estimation using the DM-RS and CSI-RS. The channel estimation section 1044 outputs a channel estimation value obtained by using the DM-RS to the demodulation section 1045, and further outputs a channel estimation value obtained by using the CSI-RS to the feedback control information generating section 1046. The demodulation section 1045 demodulates the shared channel signal using the channel estimation value.

The feedback control information generating section 1046 generates CSI (feedback information) using the channel estimation value. As the CSI, there are CSI (PMI, CDI, CQI) for each cell, inter-cell CSI (phase difference information, amplitude difference information), RI (Rank Indicator) and the like. These pieces of CSI are transmitted to the radio base station apparatus as feedback on the PUCCH and PUSCH.

In the present invention, the channel estimation section 1044, demodulation section 1045 and feedback control information generating section 1046 are a signal processing section that performs signal processing using a reference signal sequence transmitted from the radio base station apparatus. When the reference signal sequence is a DM-RS sequence, the signal processing section is the channel estimation section 1044 and demodulation section 1045. Meanwhile, when the reference signal sequence is a CSI-RS sequence, the signal processing section is the channel estimation section 1044 and feedback information generating section 1046.

In the radio communication system having the above-mentioned configuration, first, the RS sequence generating section 2042 of the radio base station apparatus generates a reference signal sequence using a pseudo random sequence using the UEID. At this point, when the reference signal sequence is a DM-RS sequence, the section 2042 generates the DM-RS with the DM-RS sequence using the pseudo random sequence expressed in above-mentioned equation (3) (first method), generates the DM-RS with the DM-RS sequence using the pseudo random sequence expressed in above-mentioned equation (4) or (5) (second method), generates the DM-RS with the DM-RS sequence using the pseudo random sequence expressed in above-mentioned equation (6) (third method), or generates the DM-RS with the DM-RS sequence using the pseudo random sequence expressed in above-mentioned equation (7) (fourth method). Further, when the reference signal sequence is a CSI-RS sequence, the section 2042 generates the CSI-RS with the CSI-RS sequence using the pseudo random sequence expressed in above-mentioned equation (8) (fifth method), generates the CSI-RS with the CSI-RS sequence using the pseudo random sequence expressed in above-mentioned equation (9) (sixth method), or generates the CSI-RS with the CSI-RS sequence using the pseudo random sequence expressed in above-mentioned equation (10) (seventh method). In addition, in the case of the third method, the user terminal is notified of the information of the term $X_2$ in the pseudo random sequence of (Eq. 6) dynamically on a downlink control channel (for example, DCI). In the case of the second method, fourth method, sixth method and seventh method, the user terminal is notified of the information of the term $X_1$ in the pseudo random sequence of (Eq. 4) or (Eq.5), the information of the term $Y_1$ in the pseudo random sequence of (Eq. 7), the information of the term $X_3$ in the pseudo random sequence of (Eq. 9), and the information of the term $Y_2$ in the pseudo random sequence of (Eq.10) semi-statically by higher layer signaling (for example, RRC signaling), respectively.

Next, the user terminal uses the pseudo random sequence expressed in above-mentioned (3) in the first method, uses the pseudo random sequence expressed in above-mentioned (4) or (5) in the second method, uses the pseudo random sequence expressed in above-mentioned (6) in the third method, uses the pseudo random sequence expressed in above-mentioned (7) in the fourth method, uses the pseudo random sequence expressed in above-mentioned (8) in the fifth method, uses the pseudo random sequence expressed in above-mentioned (9) in the sixth method, and uses the pseudo random sequence expressed in above-mentioned (10) in the seventh method. In the first to seventh methods, since the pseudo random sequence using the UEID is used, even when the cell IDs are the same in the second heterogeneous environment, each user terminal is capable of using a different reference signal sequence. In each user terminal, using thus obtained reference signal sequence, the channel estimation section 1044 performs channel estimation, the demodulation section 1045 demodulates the data, and the feedback information generating section 1046 generates the feedback information.

In such control, when the DM-RS sequence or CSI-RS sequence is used which is generated by using the pseudo random sequence expressed in above-mentioned equations (3) to (10), in the second heterogeneous environment, although the cell ID of the cell of the macro base station eNB is the same as the cell ID of the cell of the overlaid remote radio equipment RRE, since UEIDs are mutually different among user terminals UEs, different DM-RS sequences or CSI-RS sequences are used among the user terminals UEs, and the possibility is low that the multiplexing positions of DM-RSs or CSI-RSs are the same. Therefore, the collision of DM-RSs or CSI-RSs does not occur, and it is made ease that the user terminal UE determines whether a downlink signal is a downlink signal from the macro base station eNB or a downlink signal from the remote radio equipment RRE. As a result, it is possible to maintain channel estimation accuracy of the DM-RS or CSI-RS, demodulation accuracy of the PDSCH and CSI accuracy.

In the above-mentioned descriptions, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2011-244007 filed on Nov. 7, 2011, and Japanese Patent Application No. 2011-246875 filed on Nov. 10, 2011, entire contents of which are expressly incorporated by reference herein.

The invention claimed is:

1. A user terminal receiving signals CoMP (Coordinated Multi-Point) transmitted from a plurality of radio base station apparatuses, the user terminal comprising:
   a reception circuit that receives downlink control information including 1-bit given information used in initialization of a pseudo random sequence; and
   a signal processing circuit that performs signal processing using a reference signal sequence which is generated by using the pseudo random sequence initialized with use of an equation including a term defined based on the given information,
   wherein, when the given information is "1", the term is user-specific information other than cell identification information.

2. The user terminal according to claim 1, wherein, when the given information is "0", the term is different information from that when the given information is "1".

3. The user terminal according to claim 1, wherein the reference signal sequence is a demodulation reference signal and the signal processing circuit comprises a demodulation circuit that demodulates a reception signal.

4. The user terminal according to claim 2, wherein the reference signal sequence is a demodulation reference signal and the signal processing circuit comprises a demodulation circuit that demodulates a reception signal.

5. A radio base station apparatus communicating with a user terminal that receives signals CoMP (Coordinated Multi-Point)-transmitted from a plurality of radio base station apparatuses, the radio base station apparatus comprising:
   a generation circuit that initializes a pseudo random sequence using an equation including a term defined based on 1-bit given information and generates a reference signal sequence using the pseudo random sequence; and
   a transmission circuit that transmits the reference signal sequence to the user terminal and transmits downlink control information including the given information to the user terminal,
   wherein, when the given information is "1", the term is user-specific information other than cell identification information.

6. A radio communication system comprising a plurality of radio base station apparatuses and a user terminal that receives signals CoMP (Coordinated Multi-Point)-transmitted from the plurality of radio base station apparatuses,
   the user terminal comprising:
   a reception circuit that receives downlink control information including 1-bit given information used in initialization of a pseudo random sequence; and
   a signal processing circuit that performs signal processing using a reference signal sequence which is generated by using the pseudo random sequence initialized with use of an equation including a term defined based on the given information,
   wherein, when the given information is "1", the term is user-specific information other than cell identification information.

7. A radio communication method in a user terminal that receives signals COMP (Coordinated Multi-Point)-transmitted from a plurality of radio base station apparatuses, the radio communication method comprising the steps of:
   receiving, by the user terminal, downlink control information including 1-bit given information used in initialization of a pseudo random sequence; and
   performing, by the user terminal, signal processing using a reference signal sequence which is generated by using the pseudo random sequence initialized with use of an equation including a term defined based on the given information,
   wherein, when the given information is "1", the term is user-specific information other than cell identification information.

* * * * *